US007013360B2

(12) United States Patent
Lee

(10) Patent No.: US 7,013,360 B2
(45) Date of Patent: Mar. 14, 2006

(54) EFFICIENT USE OF MULTIPLE BUSES FOR A SCALABLE AND RELIABLE HIGH-BANDWIDTH CONNECTION

(75) Inventor: David M. Lee, Portland, OR (US)

(73) Assignee: Intel Corporation, Santa Clara, CA (US)

(*) Notice: Subject to any disclaimer, the term of this patent is extended or adjusted under 35 U.S.C. 154(b) by 183 days.

(21) Appl. No.: 10/643,347

(22) Filed: Aug. 15, 2003

(65) Prior Publication Data

US 2004/0039865 A1  Feb. 26, 2004

Related U.S. Application Data

(62) Division of application No. 09/650,010, filed on Aug. 28, 2000, now Pat. No. 6,622,194.

(51) Int. Cl.
    *G06F 13/14* (2006.01)

(52) U.S. Cl. .................. 710/305; 710/112; 710/39
(58) Field of Classification Search ............... 710/100, 710/107, 305, 306, 310, 313, 314, 315, 316, 710/36, 38, 40
See application file for complete search history.

(56) References Cited

U.S. PATENT DOCUMENTS

| 5,613,078 | A | | 3/1997 | Kishigami |
| 5,717,875 | A | | 2/1998 | Cutlerywala et al. |
| 5,828,865 | A | * | 10/1998 | Bell ........................... 703/27 |
| 5,872,944 | A | | 2/1999 | Goldrian et al. |
| 5,930,484 | A | | 7/1999 | Tran et al. |
| 6,088,370 | A | | 7/2000 | Bell |
| 6,108,736 | A | | 8/2000 | Bell |
| 6,173,348 | B1 | | 1/2001 | Hewitt |
| 6,202,116 | B1 | * | 3/2001 | Hewitt ...................... 710/305 |
| 6,457,085 | B1 | | 9/2002 | Reddy |
| 6,678,782 | B1 | * | 1/2004 | Aydemir et al. ............ 710/316 |

OTHER PUBLICATIONS

Patterson, David A. et al., "Computer Architecture A Quantitative Approach", Second Edition 1996, pp. 496-504, Morgan Kaufmann Publishers, Inc., San Francisco, California USA.

* cited by examiner

*Primary Examiner*—Glenn A. Auve
(74) *Attorney, Agent, or Firm*—Blakely, Sokoloff, Taylor & Zafman LLP

(57) ABSTRACT

In one embodiment, a system is disclosed having a first device, a second device, and two sets of bi-directional buses that couple the first and second devices. The devices are to perform transactions with each other over the buses, such that each set of buses has a dominant, but not exclusive, direction, for sending transaction information and data, that is opposite the other. Other embodiments are also described and claimed.

13 Claims, 3 Drawing Sheets

EFFICIENT USE OF MULTIPLE BUSES FOR A SCALABLE AND RELIABLE HIGH-BANDWIDTH CONNECTION

This is a divisional of U.S. application Ser. No. 09/650,010, filed on Aug. 28, 2000, now U.S. Pat. No. 6,622,194.

FIELD OF THE INVENTION

This invention is generally related to the use of multiple-bus architectures in electronic systems to achieve higher bandwidth connections.

BACKGROUND

A bus serves as a low cost and versatile, shared communication link between the devices of an electronic system. The bus defines a single interconnection scheme, so that new devices that connect to the bus can be developed and easily added to the system. The cost is low since a single set of wires or other media are shared by the devices. However, the bus does create a communication bottleneck especially when there are a relatively large number of devices that may need to be connected to it.

In some electronic systems, an integrated circuit (IC) that acts as a concentrator is connected to multiple other ICs that act as expanders. An example of a concentrator is a bridge that can interface a processor-memory bus on one side, to multiple expander devices on another side. The expander devices connect to input/output (I/O) buses, and can implement functions that are either optional in the system or too costly to integrate into a single IC die.

Each expander device may be connected to the concentrator by a single bus, and by using a split transaction bus protocol. In such a protocol, the full transaction, e.g. read or write, is broken into two parts: a request packet and a completion packet. For instance, in a read transaction, the expander issues a request packet that specifies an address from which to read data. Next, once the data has been read by the concentrator, a completion packet is sent to the expander enclosing the read data. Thus, such a bus protocol provides higher bandwidth, because the bus is available for other transactions during the time the concentrator is accessing the read data. However, a split transaction bus usually has higher latency as compared to a fully tenured bus in which a bus agent holds the bus while waiting for the read data to become available.

One way to increase the bus bandwidth between two devices is to use multiple buses as completely separate entities. In that case, each full transaction, including request and completion packets, is performed on a single bus, and transactions are alternately fed to one bus and then the other. Another solution is to use a pair of oppositely directed, unidirectional buses. Finally, bandwidth can be increased by simply enlarging the data handling portion of a single bus.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Various embodiments of a multiple bus connection between devices are disclosed. In one embodiment, two devices are connected by two sets of bi-directional buses. The first and second devices are to perform transactions with each other over these buses, such that each of the sets has a dominant but not exclusive direction, for sending transaction information and data, that is opposite the other. In other words, a bus may turn around if it is available and is needed to support another in together handling heavy traffic in one direction. Such an important flexibility allows efficient use of the available signals on the buses, for high bandwidth in a variety of traffic scenarios.

The use of such a bus connection may allow the number of turn-around cycles on split transaction buses to be reduced, by keeping packets moving in one direction on one bus and in the opposite direction on the other bus. Turn-around cycles are a result of the split transaction bus protocol in which even if all of the data to be transferred is heading in one direction between two devices, for each packet traveling in one direction there will always be another one that needs to go in the opposite direction. For instance, for every request packet that travels from the first device to the second device, there needs to be a completion packet which must travel from the second device back to the first device. Returning the completion packet on the same bus that provided the request packet requires a certain number of clock cycles to pass before the completion packet may be sent. The reduction in bandwidth that occurs due to these turn-around cycles on a bus is essentially alleviated using a multiple bus connection according to the different embodiments of the invention described here. In addition, certain embodiments of the multiple bus connection allow the flexibility to change the distribution of packets being sourced, from just one preferred bus to both buses if needed for greater bandwidth in one direction, and then changing back to the one preferred bus once the bus traffic becomes more evenly mixed in both directions.

Figure 1:
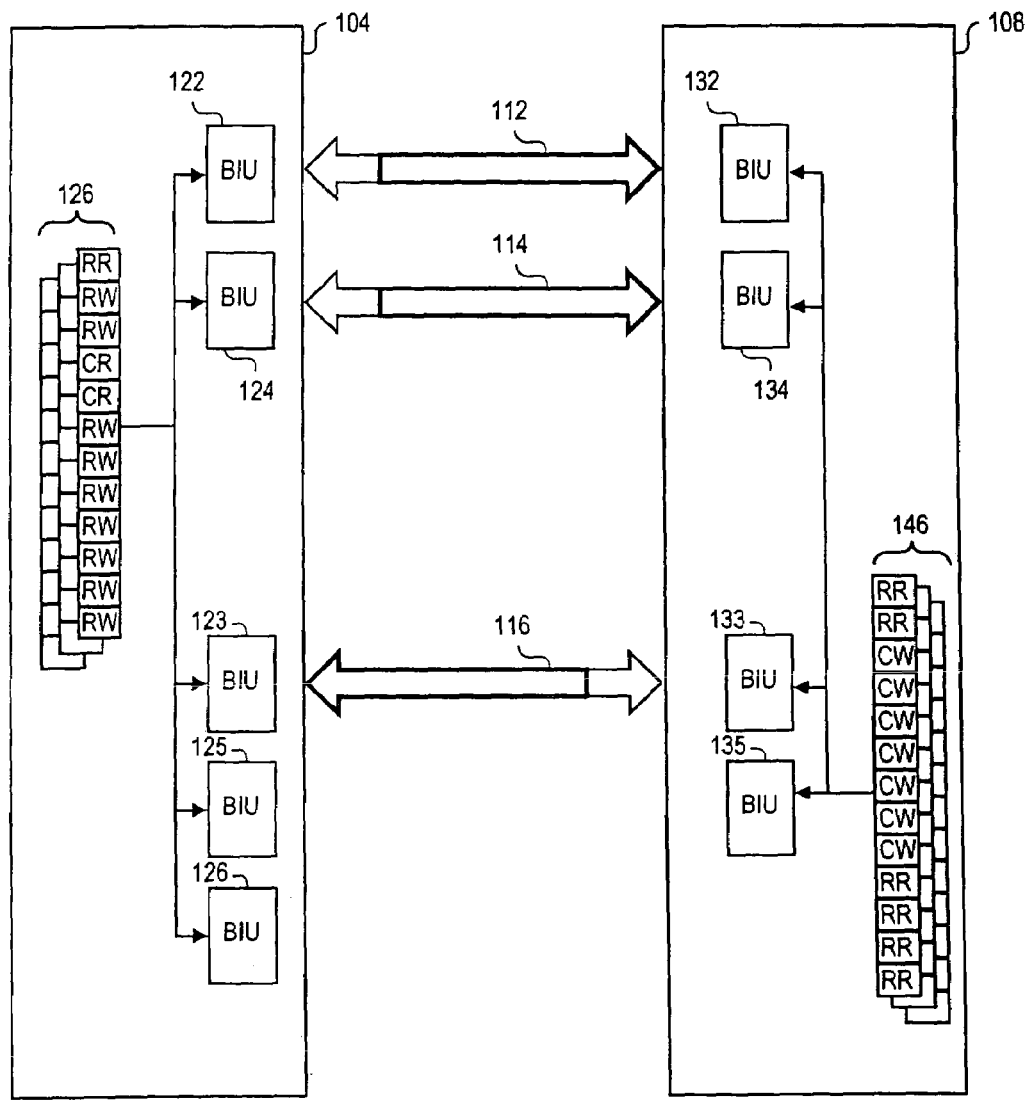
FIG. 1 shows a high bandwidth connection between two devices, according to an embodiment of the invention.

FIG. 1 shows a block diagram of an embodiment of the multiple bus connection between two devices. A first device 104 and a second device 108 may be part of a wide range of electronic computing and/or communication systems, such as a general purpose computer system. Each of these devices may be part of separate IC dies in the same package. Alternatively, the devices may be separate IC dies that are in separate IC packages installed on a printed wiring board. The bus connection between the devices includes a first bus 112, a second bus 116, and a third bus 114. It will be appreciated that although only three buses are shown in FIG. 1, the invention need not be limited to just three buses and, in general, may be applicable to two or more buses which can meet the bandwidth required between the two devices. In addition, the bus connection between the two devices may be direct as shown, where there are no intervening bridges or other components between the devices.

The first device 104 contains a set of queues 126 that are coupled to all of the buses via separate bus interface units (BIUs) 122 . . . 126. A similar configuration may be in the second device 108, with a set of queues 146 and BIUs 132 . . . 135. The queues 126, 146 store transaction information and data related to a number of bus transactions to be performed over the buses. The queues 126, 146 thus provide a first in first out access to transaction data, transaction information, and/or pointers to such information, for a number of transactions to be performed by the respective device 104, 108. These may be read and write split transactions that may involve write request (RW) packets containing write data, read request (RR) packets containing an address of a location to read, read completion (CR) packets that contain the requested read data, and write completion (CW) packets containing confirmation that a write has completed successfully. Other types of packets may be provided, such as configuration read/write and special cycles (e.g. lock/unlock).

These transactions may be explicitly directed to a particular device, or they may be directed to an address range claimed by a number of devices. In those embodiments where each bus connects only two devices, such as shown in FIG. 1, the transactions may, by definition, be directed to only a single device. However, in other embodiments that permit more than two devices to share the same bus, the transaction may identify the particular device to which it is directed. In such a situation, devices other than the first and second devices 104, 108 are essentially absent from the communications between the sending and receiving devices.

The first device 104 includes a number of BIUs 122 . . . 126, where each BIU is responsible for interfacing the queues 126 to its respective bus so that transaction information and data are properly transferred between the queues and the bus. In the example of FIG. 1, although there are five BIUs provided in the first device 104, the connection between the sending and receiving devices has only three buses 112, 114 and 116 such that two of the BIUs are unused. The buses may be of the synchronous or asynchronous variety, depending upon the desired performance. For instance, a synchronous bus may permit greater throughput between the devices over a relatively short distance, whereas an asynchronous bus allows data transfers to occur more reliably over a much longer distance. Yet another possibility is a source synchronous bus in which the source device provides a clock as well as data. Furthermore, each bus may be bi-directional between the sending and receiving devices. It should be noted that each bus need not have the same width or run the same protocol as the other.

At very high bus clock frequencies and relatively long physical bus lengths, the packet flight time between the two devices may span multiple clock cycles. For instance, there may be two clock cycles required for information sent from one device to arrive at the receiving device. Therefore, to turn a bus around, a minimum of two clock cycles are needed to avoid potential data collision on the bus. When the bus supports high data transfer rates, these turn-around cycles degrade the sustained bandwidth of the bus, particularly for shorter data sizes. Although larger data sizes may result in higher bandwidth, they are not always practical and in many applications, such as transaction processing, it is desirable to have improved performance at smaller data sizes.

Accordingly, various embodiments of the invention may improve such applications, by providing that when the first device 104 sends a request packet on the first bus 112, a corresponding completion packet is not guaranteed to return on the first bus 112. Rather, this completion packet will most likely be received over the second bus 116. Such an arrangement tends to bring the number of turn-around cycles on the first bus 112 to zero, if the data traffic were evenly mixed in both directions, causing the two bi-directional buses 112 and 116 to behave largely like two unidirectional links or a small ring. Importantly, while each of the buses 112 and 116 has a preferred or dominant direction, as indicated by a bold arrow in FIG. 1, either bus may still turn-around if needed to support the other in together handling heavy traffic in one direction. Such flexibility allows efficient use of the available signals on the buses, for high bandwidth in a variety of traffic scenarios.

Referring to FIG. 1, in general, any one of the BIUs 122, 124, and 123 may claim a transaction from the queues 126, and send it as a packet over its respective bus. However, the BIUs 122 and 124, corresponding to buses 112 and 114, are preferred and are therefore more likely to claim the transaction. In the same way, in the second device 108, the BIU 133 is the preferred unit among the BIUs 132 . . . 135 that can claim transactions from the queues 146. This is one way in which the direction of packet travel over the buses is maintained. Such a scheme allows that the design of each BIU be essentially identical, with some small differences in the way they are configured to determine which is or are preferred.

Each BIU may be configured to start in a single bus mode, namely one in which the BIU is equally likely as the others in the same device to claim a transaction from the queue. Alternatively, each BIU may be disabled initially. In either scenario, the multiple BIUs may operate as part of a multiple bus connection, with some being preferred over the others, after being configured by software.

A basic configuration for the multiple bus connection includes two sets of buses (a single bus in each set) where each has a dominant direction, for sending packets, that is opposite the other. However, this technique may be scaled to embodiments having more than two buses, such as the three bus configuration shown in FIG. 1. In such a configuration, a first set of buses 112 and 114 each have the same preferred directions shown in bold, whereas the second set includes only a single bus 116 for transporting packets predominantly in the opposite direction. Thus, the logic circuitry in the first device 104 is to give BIUs 122 and 124 preference over the BIU 123, when performing a transaction from the queues 126. Similarly, in the second device 108, the logic is to give the BIU 133 preference over the BIUs 132 and 134, when performing a transaction from the queues 146.

Figure 2:
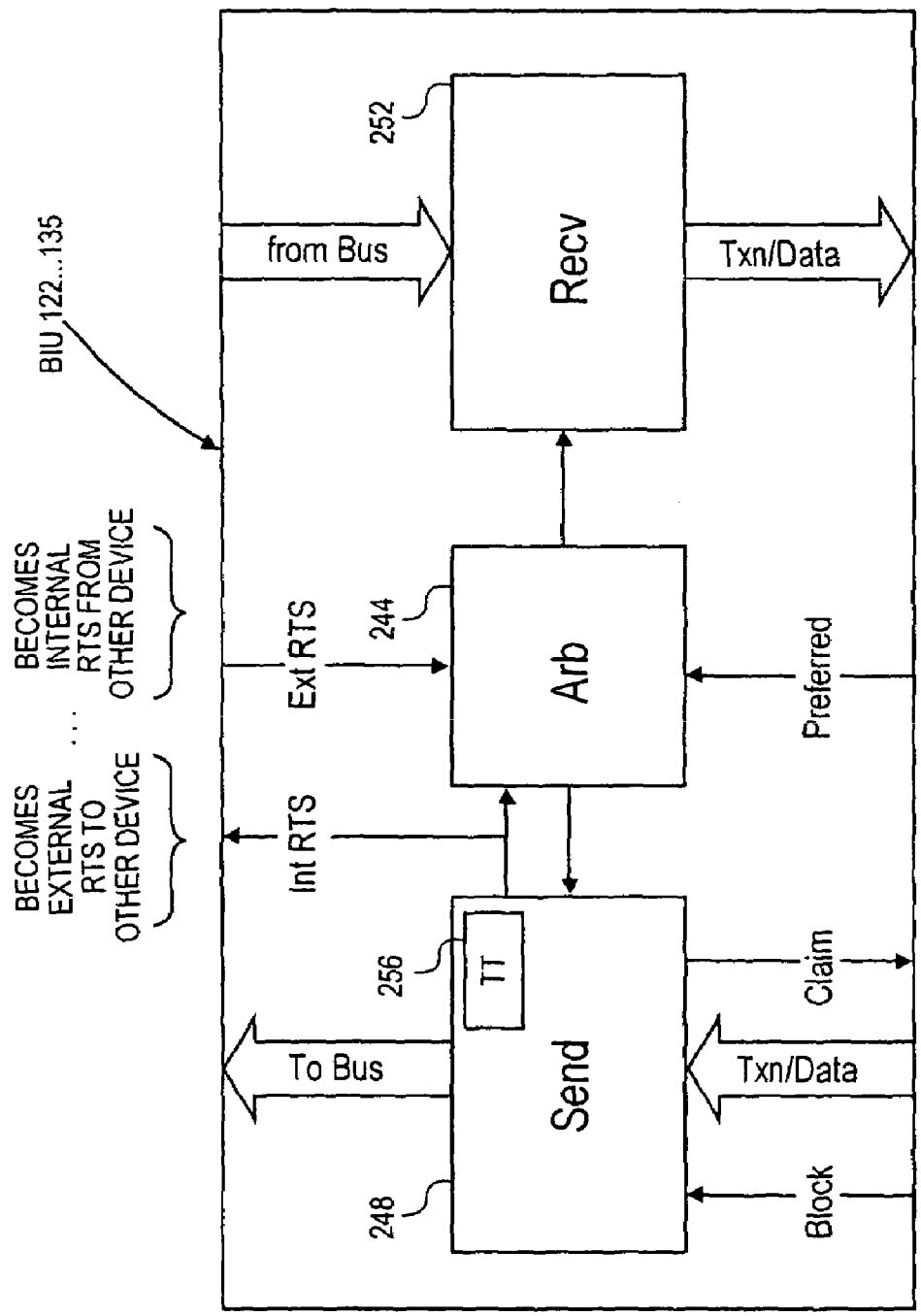
FIG. 2 depicts an embodiment of the bus interface unit.

The logic that gives one or more bus interfaces preference over others may be designed in many different ways. Such logic may be implemented as part of each BIU 122 . . . 135 or as part of separate selection circuitry (not shown). For instance, an embodiment of the BIU 122 . . . 135 is shown in FIG. 2. Each BIU includes a send block 248, a receive block 252, and a bus arbiter 244. The send block 248 monitors the internal queues (126 or 146) for transactions that are ready to be performed. To request its bus through the arbiter 244, the send block 248 asserts an internal request to send (RTS) signal, to begin arbitration for its bus. When the arbiter 244 signals that bus ownership is granted, the send block 248 formats a packet for the claimed transaction, and sends the packet over the bus. In a particular embodiment of the invention, the decision to send another packet or to release the bus is made solely in the send block 248. For instance, the send block in a BIU may be configured to never release the bus so long as there are valid enqueued transactions to send, when this BIU is marked as being preferred.

In a particular embodiment, the arbitration logic is "distributed" in the sending and receiving devices. Each arbiter 244 in a given BIU and device monitors requests for ownership from various bus agents, including the send block 248 in this BIU and device as well as send blocks in other BIUs and devices that are connected to the bus and that may assert their external RTS signal. The arbiter is made "unfair" to give a preference of one bus agent, namely its send block 248, over another. Each arbiter 244 tracks bus ownership and may have a modified rotating priority scheme, in which priority does not rotate fairly, but is fixed at a bus agent marked as preferred. The two arbiters for a given bus are to remain in lock step, such that both reflect the same state of the bus at all times. For instance, in situations where the flight time between devices on the bus is long relative to a bus clock period, even though an internal RTS is received before an external RTS, the arbiter does not grant ownership of the bus until a predetermined number of bus clock cycles, longer than the maximum flight time, have elapsed. An alternative to such distributed logic circuitry may be a central arbiter which receives and processes all of the RTS signals from all bus agents.

To prevent the same transaction from being sent over two or more buses simultaneously, the preferred BIU blocks the other BIUs in the device when claiming a transaction. In general, each BIU receives a preferred signal (shown in FIG. 2 as being received by the arbiter 244) and a block signal (shown in FIG. 2 as being received by the send block 248). The preferred signal tells the arbiter 244 that its send block 248, in the same BIU, is the priority agent. The block signal prevents the send block 248 from claiming any transactions from the internal queues. When using multiple BIUs in a given device, such as BIUs 122 . . . 124 in the first device 104 of FIG. 1, these BIUs may be given decreasing precedence by cascading a control signal through the BIUs such that, for instance, BIU 122 has precedence over BIU 124, which in turn has precedence over BIU 123. This helps ensure that a transaction is not duplicated on multiple buses when multiple BIUs and buses are available to claim the transaction. Although not specifically shown, logic is also provided to generate these two control signals, where such logic may be programmable by software to allow each BIU to be configured for either a conventional single bus operation or a multiple bus connection having dominant directions of packet travel that are opposite.

Each BIU 122 . . . 135 also includes the receive block 252 which may essentially be the same as a conventional receive block designed to operate with only a single bus. This is based upon the understanding that the receive block 252 may act largely as a slave, decoding packets from the bus whenever activated by the arbiter 244. It should be noted that since each device is normally connected to the other through at least one pair of buses that have oppositely directed dominant directions of packet travel, neither device is likely to be starved by not being able to receive packets from the other.

FIG. 2 illustrates another feature of the BIU 122 . . . 135, namely that of a tenure timer (TT) 256 in the send block 248. The TT 256 is a means of balancing the bandwidth that may be obtained on its corresponding bus, with the latency associated with transactions on the bus. In operation, the timer is set to a value, programmed by software, each time ownership of the bus is obtained by the send block 248. The timer then counts down for each clock cycle of bus ownership. If the timer has expired, and another bus agent is requesting the bus, then the send block 248 releases the bus at the end of the packet being sent. This allows non-preferred bus agents to use the bus when the preferred agent is idle. At the same time, the mechanism also prevents a non-preferred agent (i.e. a send block) from holding the bus for too long.

The following example may help explain certain advantageous features of the multiple bus connection described above. Referring back to FIG. 1, assume for instance that the first device is sending a number of request packets, where each packet is part of a respective one of a number of transactions, over one or more buses that are preferred by the first device for sending packets. In this case, this set of preferred buses includes buses 112 and 114. The bus 116 is a member of a not-preferred set, so that the packets sourced by the first device are not likely to be sent over the bus 116. Such packets, may, for instance, be based upon the seven write request transactions shown in the queues 126.

The second device 108 receives the write request packets in its BIUs 132 and 134, and then executes the requests to generate completion information (labeled "CW" in the queues 146). As information for these completion packets become available in the queue, they may be claimed by the preferred BIU 133. The completion packets, each being part of a respective one of the write transactions that was initiated by the first device 104, are sent over the bus 116.

Since the BIUs 122 and 124 are marked as being preferred, a majority of the enqueued transactions, in the queues 126, are likely to be sent over the buses 112 and 114. However, it is possible that a number of these enqueued transactions may be performed over the not-preferred bus 116, if this bus 116 is not being used by the second device 108 or is otherwise idle. In this way, the maximum available bandwidth between the two devices can be used, while still giving the second device 108 (which has preference over the first device 104 on the bus 116) the ability to send its packets to the first device.

In some circumstances, it may be desirable to disable access by the first device 104 to one or more of the preferred buses 112, 114. This may occur, for instance, if either bus wiring or bus interface circuitry has failed. In that case, all subsequent transactions will be diverted to the not-preferred bus 116. In addition, corresponding completion packets are received from the second device 108 over the same, not-preferred bus 116. Thus, the logic circuitry in the first device 104 may be programmed by system software or configured in hardware to revert back to a single bus operation, if one or more of the other bus connections have failed, thereby enabling a more reliable connection between the two devices.

If the expected data transfer between the two devices will not be evenly mixed in both directions, but is predominantly, for instance, write transactions by the first device, then the configuration of FIG. 1 showing two preferred buses 112 and 114 and one not-preferred bus 116 may be particularly beneficial, where the buses 112, 114, and 116 serve to transport the write data from the first device 104 to the second device 108, while the bus 116 is used to return the completion packets back to the first device 104.

Certain embodiments of the multiple bus connection described here have advantages compared to the use of two or more conventional, "separate" buses. A request sent on a "separate bus" still has to receive its completion on the same bus. This means the number of turn-around cycles per bus, in a dual separate bus scenario, remains about the same as that of a single separate bus. In contrast, the multiple bus connection embodiments described here have a reduced number of turn-around cycles per bus, because the request and completion packets are generally not sent on the same bus. Simulation results have shown that bandwidth in a two-bus multiple bus connection is increased significantly over the dual separate bus topology, particularly at lower data sizes, for the same bus clock frequency. In addition, it may be difficult to distribute transactions among two or more separate buses and still maintain their ordering on the receiving device, without introducing extra idle cycles on the buses.

A two-bus embodiment of the multiple bus connection also provides an advantage as compared to dual "unidirectional" links, because of the ability to change the distribution of packets between the two buses. With unidirectional links, as the data traffic changes to predominantly moving in one direction between the two devices, such as in all read or all write transactions by one device or reads by one device and writes by the other, the peak bandwidth may be limited to about one-half of the bandwidth obtained from traffic which is evenly mixed. This is because with unidirectional links, the transaction data is transferred on only one of the two buses, while the other bus transfers only corresponding request or completion packets with no transaction data. Accordingly, as compared to unidirectional links, the bandwidth obtained using certain embodiments of the multiple bus connection described here is equal in the even traffic mix cases, and, advantageously, almost double for the one-sided traffic cases due to the use of both buses to transfer transaction data.

A further advantage of certain embodiments of the multiple bus connection appears in relation to the use of a single but wider bus. The described multiple bus connection advantageously allows an existing packet format, for a conventional separate bus, to be used. In addition, if a single bus connection already exists then a greater amount of logic circuitry may be shared between the single and multiple bus designs than with a wider single bus design. Also, the increase in bandwidth in going from a 16-bit bus to a wider 32 bit bus, as an example, is smaller than using two 16-bit buses that are part of a multiple bus connection as described here. Additional advantages to the different embodiments of the multiple bus scheme described here may be present although they are not listed here.

Figure 3:
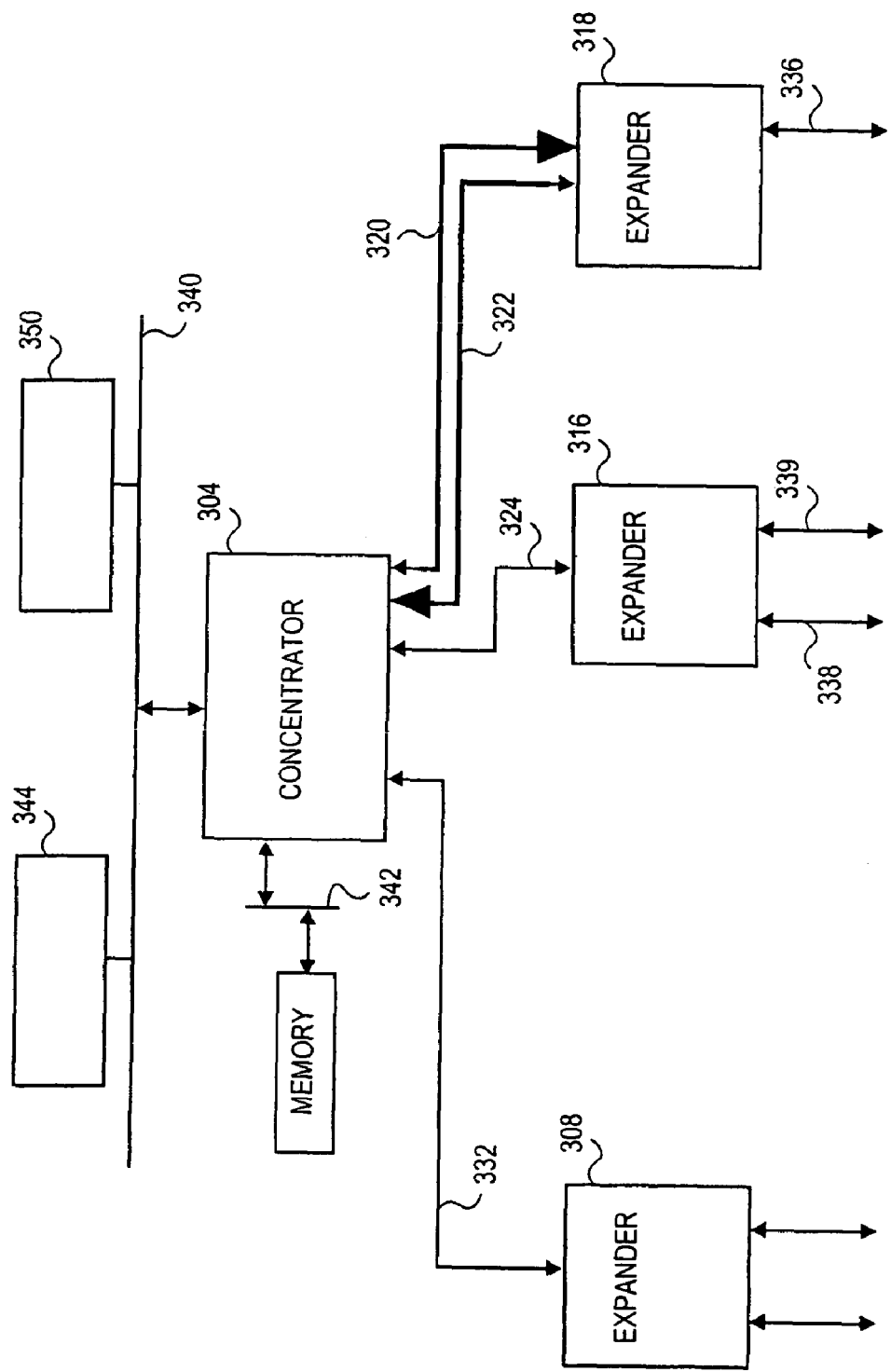
FIG. 3 shows a block diagram of the connection between a concentrator and several expander devices.

The multiple bus schemes described above may be used in a wide range of system applications, including for instance the system-logic chip set configuration shown in FIG. 3. A concentrator device 304 is connected to a number of expander devices 308 . . . 318. Each of the concentrator and expander devices may have an internal topology as shown in FIG. 1 including BIUs and transaction queues. Each of the expander devices 308 and 316 are connected to the concentrator 304 via a single bus 332 and 324. In contrast, the connection between the concentrator and the expander device 318 is via multiple buses 320 and 322 wherein each bus has a dominant direction of packet travel that is opposite the other as indicated in the figure. The expander 318 may be a bus expander bridge that expands and formats data received over the multiple buses 320 and 322 to provide output to a wider bus 336, where the latter bus may have a different protocol than buses 320 and 322. The concentrator 304 may be a controller which functions as a bridge to a processor bus 340(where devices 344 and 350 are processors)and a memory bus 342, depending upon the application. As to the expander 316, this may be a graphics expander bridge which provides access to multiple graphics buses 338 and 339. It can be seen that the multiple bus scheme allows, for instance, that the two expander devices 308 and 316 to be replaced by a single expander device (not shown) having dual bus interfaces to buses 332 and 324. This allows the flexibility of connecting higher bandwidth expander devices to the concentrator 304 as input/output technology progresses.

To summarize, various embodiments of the invention have been described that are directed to a flexible multiple-bus connection between a first device and a second device. The connection features two sets of bi-directional buses. The devices may perform split transactions with each other over the buses, such that each set of buses has a dominant direction, for sending transaction request and completion packets, that is opposite the other. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An integrated circuit (IC) device, comprising:
a first bus interface unit to send a transaction packet over a first bus and not a second bus;
a second bus interface unit to send a transaction packet over the second bus and not the first bus; and
a queue to store information that characterizes a plurality of bus transactions to be claimed by one of the first and second bus interface units and performed over one of the first and second buses,
wherein the IC device can be configured to operate in a first way that does not give either bus interface unit preference over the other when claiming a transaction from the queue,
and wherein the IC device can be configured to operate in a second way in which the first bus interface unit is preferred over the second bus interface unit when claiming a transaction from the queue.

2. The IC device of claim 1 wherein the queue is to store information that characterizes the plurality of transactions as split transactions,
and wherein each transaction is to be performed in the second way by the first bus interface unit sending a request packet for said transaction over the first bus and not the second bus, and the second bus interface unit receiving a completion packet for said transaction over the second bus and not the first bus.

3. The IC device of claim 1 further comprising:
a third bus interface unit to send a transaction packet over a third bus and not the first bus and not the second bus,
and wherein the IC device can be configured to operate in the second way so that the second bus interface unit is preferred over the third bus interface unit when claiming said transaction from the queue.

4. An integrated circuit (IC) device, comprising:
a first bus interface unit to send transaction information over a first bus and not a second bus, the first bus interface unit having a bus arbiter and a send block;
a second bus interface unit to send transaction information over the second bus and not the first bus; and
a queue to store information that characterizes a plurality of bus transactions to be claimed by one of the first and second bus interface units for being performed over one of the first and second buses,
wherein the send block is to a) monitor the queue for transactions that are ready to be performed, b) request the first bus through the arbiter, and c) format and send a transaction packet into the first bus,
wherein the arbiter gives preference to the send block over other bus agents in response to a preference signal being asserted.

5. The IC device of claim 4 wherein the first bus interface unit further comprises a receive block to decode transaction packets received over the first bus, in response to being activated by the arbiter.

6. The IC device of claim 4 wherein the send block further includes a software-programmable timer that is to be set to a predetermined value each time the send block obtains ownership of the first bus, to prevent a non-preferred agent from holding the first bus.

7. The IC device of claim 4 wherein the send block further includes means for balancing bandwidth on the first bus with latency associated with transactions on the first bus.

8. The IC device of claim 7 wherein request packets, for a plurality of claimed transactions, respectively, are to be sent predominantly by the first bus interface unit rather than the second bus interface unit, and completion packets, for said plurality of claimed transactions, respectively, are to be received predominantly by the second bus interface unit rather than the first bus interface unit.

9. An integrated circuit (IC) device, comprising:
a first bus interface unit to send a transaction packet over a first bus and not a second bus;
a second bus interface unit to send a transaction packet over the second bus and not the first bus; and
a queue to store information that characterizes a plurality of bus transactions to be claimed by one of the first and second bus interface units for being performed over one of the first and second buses,
wherein to prevent the same transaction from being sent over two buses simultaneously, one of the first and second bus interface units, which is preferred over the other, is to block the other when claiming a transaction from the queue.

10. The IC device of claim 9 being programmable by software to allow the first and second bus interface units to be configured for one of a) bi-directional bus operation for each, and b) bi-directional operation for both where each has a dominant direction of packet travel that is opposite to the other.

11. A method for performing bus transactions using multiple buses, comprising:
sending a transaction packet over a first bus and not a second bus, using a first bus interface;
sending a transaction packet over the second bus and not the first bus, using a second bus interface;
buffering information that characterizes a plurality of bus transactions to be claimed by one of the first and second bus interfaces to be performed over one of the first and second buses;
operating the bus interfaces in a first way that does not give either bus interface preference over the other when claiming a buffered transaction; and
operating the bus interfaces in a second way in which the first bus interface is preferred over the second bus interface when claiming a buffered transaction.

12. The method of claim 11 wherein the buffered transactions are split transactions, the method further comprising:
while operating in the second way, sending a request packet for a transaction over the first and not the second bus using the first bus interface; and
receiving a completion packet for the transaction over the second bus and not the first bus, by the second bus interface.

13. The method of claim 11 further comprising:
sending a transaction packet over a third bus and not the first bus and not the second bus, using a third bus interface; and
operating in the second way so that the second bus interface is preferred over the third bus interface when claiming the buffered transaction.

* * * * *